Nov. 3, 1931.   H. S. HELE-SHAW ET AL   1,829,930
HYDRAULICALLY OPERATED VARIABLE PITCH AIR SCREW
Filed April 30, 1928
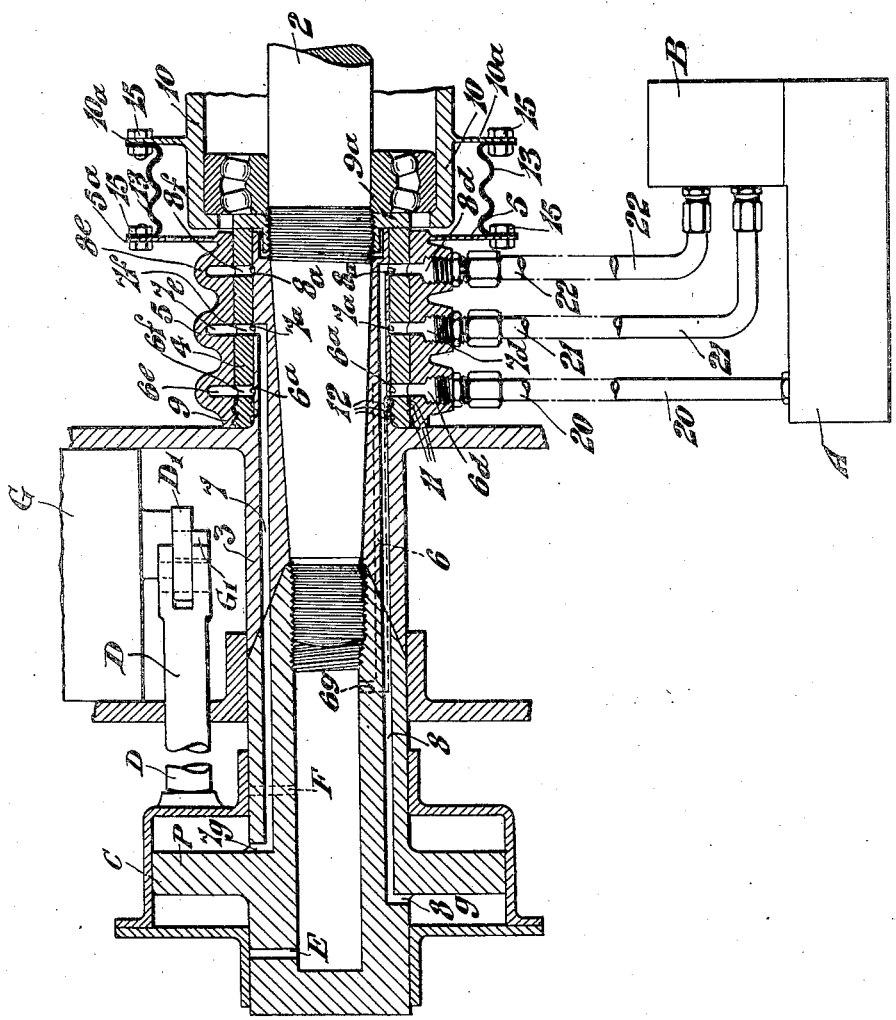
Inventors
Henry Selby Hele-Shaw
and
Thomas Edward Beacham
By B. Singer, Atty.

Patented Nov. 3, 1931

1,829,930

UNITED STATES PATENT OFFICE

HENRY SELBY HELE-SHAW AND THOMAS EDWARD BEACHAM, OF LONDON, ENGLAND

HYDRAULICALLY OPERATED VARIABLE PITCH AIR SCREW

Application filed April 30, 1928, Serial No. 273,997, and in Great Britain May 6, 1927.

This invention relates to hydraulic apparatus having fluid transmission bearings such as in variable pitch air screws operated by hydraulic means in which the liquid pressure from the pump is conveyed to a hydraulic cylinder or cylinders which rotates bodily with the propeller shaft by means of a rotating joint.

In order that a joint or bearing of this kind may hold pressure without excessive leakage it is necessary to make the running clearance extremely small and at high speeds of rotation it is found that such small clearance creates excessive heating and liability to seizure.

The present invention comprises in hydraulic apparatus a bearing sleeve or joint for a rotary member having one or more passages through which fluid under pressure can be transmitted from one or more passages in the fixed portion of the bearing sleeve or joint, wherein is provided a floating bush or liner perforated to admit of such fluid transmission. Any suitable means may be provided for preventing axial movement of the floating bush or liner.

The floating bush is provided with one or more radial holes of which the outer end or ends may register with a circumferential channel formed in the bearing face of the fixed member and communicating with a fluid inlet, while the inner end or ends register with a similar circumferential channel formed in the bearing face of the rotary member and communicating with a fluid outlet, or vice versa.

When separate supplies of fluid under pressure are required to be transmitted through the bearing two or more series of the radial holes are provided in the floating bush each being adapted to transmit fluid from a separate inlet to a separate outlet.

The circumferential channels may be provided in the floating bush or liner, or in the bush or liner as well as in the fixed and rotary members.

If such a joint be constructed without a floating bush with a running clearance of $t$ thousandths of an inch the effect of introducing a floating bush the inside clearance of which is $\frac{t}{2}$ and the outside clearance also $\frac{t}{2}$ will be that the floating bush will run at a speed equal to the means of that of the shaft and the external member and the power absorbed will be the same as without the floating bush and a clearance of $t$.

The leakage however varies as the cube of the clearance so that in the first case it is $t^3$ and the second 2 $\frac{t^3}{8}$.

In other words the provision of one floating bush reduces the leakage by 75% for the same consumption of power. These calculations are strictly correct only for a bush of negligable thickness. In actual practice the thickness of the bush would slightly modify these results.

A manner of carrying out the invention as applied to a hydraulically operated variable pitch air screw or propeller, is illustrated by the accompanying drawing which is a more or less diagrammatic sectional view of the relevant portions of the apparatus.

In this drawing 2 is the engine shaft and 3 the fixed sleeve or bearing fixed member or bearing proper.

In the hub 3 are three sets of liquid passages 6, 7 and 8 of which 6 is shown in dotted lines not being in the same plane as 7 and 8. These passages lead by radial portions respectively to circumferential channels $6a$, $7a$ and $8a$ formed in the bearing surface of the hub 3. The other ends of these passages lead to hydraulic ram apparatus operating the variable pitch gear.

The hydraulic ram apparatus has a cylinder C in which operates a piston P, and the opposite sides of this piston are placed in communication with the passages 6, 7 and 8 by means of radial passages $6g$, $7g$, $8g$ and E. In this apparatus the cylinder C slides axially on the piston P and through one or more rods D actuates the variable pitch mechanism. In this mechanism which is shown diagrammatically the rod D is connected by a link D¹ to a crank pin G¹ fixed on the stub axle G of one of the propeller blades so that it will rotate about its axis in an air screw hub 3 when the cylinder C is moved axially by the hydraulic mechanism. Should the cylinder C be forced to either end of its stroke by hydraulic pressure, either the port E or a port F will open and relieve such pressure, the liquid being supplied by the pump being by-passed along the passage 6 and pipe 20 leading to an oil reservoir A.

The object of the running joint or bearing is to place the three liquid passages 6, 7, 8 in communication respectively with three fixed fluid pressure inlets 6d, 7d and 8d in the fixed sleeve or bearing member 5. These three inlets have radial openings leading respectively to circumferential channels 6e, 7e, 8e. Between the trued inner surface of the bearing sleeve or fixed member 5 and the trued outer surface of the hub or rotating member 3 is arranged (as a working fit) the floating bush or liner 4, so that when the hub 3 rotates the bush 4 will also rotate at some speed intermediate between that of the hub 3 and zero.

In the floating bush are provided three series of radial holes 6f, 7f and 8f in register respectively with the circumferential channels 6a, 7a and 8a and also with the circumferential channels 6e, 7e and 8e.

The floating bush 4 is prevented from axial end movement with respect to the bearing sleeve or fixed member 5 to secure registration of the radial fluid passages and circumferential channels by a shoulder 9 of the hub 3, and a flange 9a on the engine shaft 2.

Fluid retaining grooves 11 and 12 are cut in the bearing surfaces near their ends, these may be of the helical type cut in such a direction as to ensure the return of the fluid to the bearing surfaces.

The fixed sleeve or bearing member 5 is attached to the engine shaft bearing member 10 by means of a semi-flexible member 13, which is sufficiently rigid to prevent the rotation of the fixed sleeve or pipe connecting member 5, and to prevent it from axial movement, but is sufficiently flexible to enable the fixed member 5 to be relieved of any strain or load due to lack of alignment. The flexible member 13 is made fluid tight so as to retain fluid leaking from the bearing, by connecting it to the flanges 10a and 5a by means of bolts 15.

What we claim and desire to secure by Letters Patent is:—

1. Hydraulic apparatus for transmitting fluid under pressure to a supply passage in a rotating member, comprising a bush having a radial fluid transmission passage, a fixed sleeve surrounding the bush and also having a radial fluid-transmission passage in communication with those in the bush, and means for transmitting fluid to the outer end of the radial fluid passage of the fixed sleeve, the bush being quite free to float and rotate in an annular space between the rotary member and the fixed sleeve while transmitting fluid from the passage in the fixed sleeve to the fluid supply passage of the rotary member.

2. Hydraulic apparatus for transmitting fluid under pressure to a multiplicity of supply passages in a rotating member, comprising a bush having a multiplicity of radial fluid transmission passages, a fixed sleeve surrounding the bush and also having a multiplicity of radial fluid transmission passages in communication with those in the bush, and means for transmitting fluid to the outer ends of the passages in the fixed sleeve, the bush being quite free to float and rotate in an annular space between the rotary member and the fixed sleeve while transmitting fluid from th passages in the fixed sleeve to the supply passages of the rotary member.

3. Hydraulic apparatus for transmitting fluid under pressure to a radial supply passage in a rotating member, comprising a fixed sleeve having a radial fluid transmission passage opening into an annular groove formed in its surface, and a bush also having a radial fluid-transmission passage, and means for transmitting fluid to the outer end of the passage in the fixed sleeve, the bush being quite free to float and rotate in an annular space between the rotary member and the inner surface in the fixed sleeve, and its radial passage being in register with the annular groove in the bearing surface of the fixed sleeve.

4. Hydraulic apparatus for transmitting fluid under pressure to a multiplicity of radial fluid supply passages in a rotary member, comprising a fixed sleeve having a multiplicity of radial fluid transmission passages, means for transmitting fluid under pressure to the outer ends of each passage in the fixed sleeve separately, and a bush also having a multiplicity of radial fluid transmission passages, the radial passages being arranged in longitudinal series and the bush being quite free to float and rotate in an annular space between the rotary member and the fixed sleeve, and each of its radial passages arranged during the rotation of the rotary member to register at one end with a corresponding radial passage in the rotary member and at the other end with a corresponding radial passage in the fixed sleeve, so that the registering passages of the series can be connected to independent supplies of liquid.

5. Hydraulic apparatus for transmitting fluid under pressure to a radial supply passage in a rotary member provided on its bearing surface with a circumferential groove into which opens a radial passage through which fluid is passed under pressure, comprising a fixed sleeve having a radial fluid-transmission passage opening into a circumferential groove formed in the bearing surface, means for transmitting fluid under pressure to the outer end of the radial passage in the fixed sleeve, and a bush also having a radial fluid transmission passage, the bush being quite free to float and rotate in an annular space between the rotary member and the fixed sleeve and its radial passage being in register with both circumferential grooves.

6. Hydraulic apparatus for transmitting fluid under pressure to a radial supply passage in a rotary member, comprising a fixed sleeve having a radial fluid transmission passage, means for transmitting fluid under pressure to the outer end of the supply passage in the fixed sleeve, a bush also having a radial fluid transmission passage registering with the passage in the fixed sleeve and also with the passage in the rotary member, and circumferential lubricating grooves, the bush being free to float and rotate in an annular space between the rotary member and the sleeve, and the circumferential lubricating grooves provided in the floating bush between its end and its radial passages.

7. Hydraulic apparatus for transmitting fluid under pressure to a radial supply passage in a rotary member, comprising a fixed sleeve having a radial fluid transmission passage, means for transmitting fluid under pressure to the outer end of the supply passage in the fixed sleeve, a bush also having a radial fluid transmission passage registering with the passage in the fixed sleeve and also with the passage in the rotary member, and circumferential helical lubricating grooves, the bush being quite free to float and rotate in an annular space between the rotary member and the sleeve, and the helical circumferential lubricating grooves being provided in the floating bush between its end and its radial passages, and inclined in such a direction as to ensure the return of the fluid from the outer to the inner portions of the bearing surfaces.

In witness whereof we affix our signatures.

HENRY SELBY HELE-SHAW.
THOMAS EDWARD BEACHAM.